(12) United States Patent
Mestha et al.

(10) Patent No.: US 7,110,142 B2
(45) Date of Patent: Sep. 19, 2006

(54) SYSTEMS AND METHODS FOR SENSING MARKING SUBSTRATE AREA COVERAGE USING A SPECTROPHOTOMETER

(75) Inventors: Lalit K. Mestha, Fairport, NY (US); Eli S. Saber, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1026 days.

(21) Appl. No.: 09/985,419

(22) Filed: Nov. 2, 2001

(65) Prior Publication Data

US 2003/0086103 A1 May 8, 2003

(51) Int. Cl.
*H04N 1/60* (2006.01)

(52) U.S. Cl. .................. 358/1.9; 358/504; 358/509; 358/518

(58) Field of Classification Search ............. 358/1.9, 358/1.4, 504, 509, 518
See application file for complete search history.

(56) References Cited

U.S. PATENT DOCUMENTS

| | | | |
|---|---|---|---|
| 5,471,313 A | 11/1995 | Thieret et al. ............. 358/296 |
| 5,519,497 A | 5/1996 | Hubble, III et al. ........ 356/445 |
| 6,236,474 B1 | 5/2001 | Mestha et al. ............. 358/520 |
| 6,449,045 B1 | 9/2002 | Mestha .................... 356/402 |
| 6,467,867 B1 * | 10/2002 | Worthington et al. ........ 347/19 |
| 6,556,932 B1 | 4/2003 | Mestha et al. .............. 702/76 |
| 6,584,435 B1 | 6/2003 | Mestha et al. ............. 702/196 |
| 6,587,793 B1 | 7/2003 | Viassolo et al. ............. 702/27 |
| 6,628,426 B1 * | 9/2003 | Denton et al. ............. 358/1.9 |
| 6,650,446 B1 * | 11/2003 | Rozzi ....................... 358/520 |
| 2003/0058460 A1 * | 3/2003 | Denton et al. ............. 358/1.9 |

FOREIGN PATENT DOCUMENTS

| | | |
|---|---|---|
| EP | 0 625 847 A1 | 4/1994 |
| EP | 0 680 198 A2 | 4/1995 |
| WO | WO 98/10585 | 3/1998 |
| WO | WO 98/46008 | 10/1998 |

OTHER PUBLICATIONS

Xia, Minghui et al. "End-To-End Color Priner Calibration by Total Least Squares Regression". IEEE Transactions on Image Processing. vol. 8 No. 5, May 1999. pp. 3-5.*

"End-To-End Color Printer Calibration By Total Least Squares Regression" by Minghui Xia et al.; IEEE Transactions on Image Processing, vol. 8, No. 5, May 1999, pp. 700-716.

"A Spectral Neugebauer Model For Dot-On-Dot Printers" by Raja Balasubramanian; pp. 1-11.

* cited by examiner

*Primary Examiner*—Mark Zimmerman
*Assistant Examiner*—Jacob P. Rohwer
(74) *Attorney, Agent, or Firm*—Oliff & Berridge, PLC.

(57) ABSTRACT

A multiple-LED sensor is used to detect area coverage of marked patches on a marking substrate. The same sensor may also be used for color calibration. The marking substrate area coverage sensor obtains reflectance measurements from marked patches of a marking substrate. For example, the marked patches may be patches of a marking substance such as toner, ink or paint, or patches marked by etching or the like. A Neugebauer model may be used to obtain the reflectance measurements. A batch least squares algorithm may be used to estimate the appropriate parameters of the Neugebauer model. For improved accuracy, a recursive least squares algorithm may be used. The recursive least squares algorithm allows the marking substrate area coverage sensor to calibrate itself to changes in the sensing environment.

13 Claims, 3 Drawing Sheets

SYSTEMS AND METHODS FOR SENSING MARKING SUBSTRATE AREA COVERAGE USING A SPECTROPHOTOMETER

RELATED APPLICATIONS

Cross-reference and incorporation by reference is made to the following copending and commonly assigned U.S. patent applications: U.S. application Ser. No. 09/862,247; U.S. application Ser. No. 09/863,042; U.S. application Ser. No. 09/888,791; U.S. application Ser. No. 09/621,860; U.S. application Ser. No. 09/562,072; U.S. application Ser. No. 09/448,987; U.S. application Ser. No. 09/449,263; U.S. application Ser. No. 09/535,007; and U.S. application Ser. No. 09/862,945. Cross-reference and incorporation by reference is also made to the following U.S. Patents: U.S. Pat. No. 5,471,313; U.S. Pat. No. 5,519,497 and U.S. Pat. No. 6,236,474.

BACKGROUND OF THE INVENTION

1. Field of Invention

This invention relates to sensing area coverage of a marking substrate.

2. Description of Related Art

Some currently available printing systems contain complex control and calibration loops, including internal process control and external color control loops. For example, printing systems disclosed in U.S. Pat. No. 5,471,313 and U.S. Pat. No. 6,236,474 contain levels 1, 2 and 3 control loops aimed at ultimately controlling the toner development process on the photoreceptor belt. These loops measure the state of the image on the photoreceptor by measuring the charge and developed mass per unit area for individual primaries, and actuate the charging and donor roll voltages to maintain the developability to some target set points. In addition, level 3 loops are designed to produce tone reproduction curves (TRCs) for each color separation (e.g., cyan, magenta, yellow and/or black) by measuring the developed toner mass on the photoreceptor belt.

A sensor such as an ETACS (Enhanced Toner Area Coverage Sensor) sensor system is used in level 2 and 3 loops to measure toner mass on the belt. The ETAC sensing head utilizes illumination by a single LED, which is tuned at a specific wavelength and uses a PIN diode as the detector.

Other printers use a similar multilevel control architecture with different kinds of sensor. The level 2 functionality is achieved using a single LED ADC (Automatic Density Sensor) sensor that measures the toner mass on the belt, and the level 3 functionality is achieved using a Color Patch-On-Paper (C-POP) sensor, which is a sensor that uses a single LED, that measures the toner density of paper-based individual primaries such as C, M, Y and K.

SUMMARY OF THE INVENTION

In all of the sensors mentioned above, marking substrate area coverage, i.e., the mass or density of a marking substance such as toner or ink per unit area of a marking substrate, such as paper or other object to be marked, is calibrated or inferred from the output of a detector that detects illumination of a single LED. Calibrating ETAC sensors to toner mass is a long and laborious process, which is almost always done offline and can lead to inaccuracies. C-POP sensors are colorblind, and hence cannot differentiate between densities of different color toners.

Recently, it has been proposed, for example in above-mentioned U.S. application Ser. No. 09/862,247, U.S. application Ser. No. 09/863,042 and U.S. application Ser. No. 09/888,791, to use a spectrophotometer with multiple illuminants, such as multiple LEDs, for automatic on-line color calibration in a printer or the like. For example, such a spectrophotometer may be mounted in the paper path of the moving copy sheets in the printer, preferably in the output path after fusing or drying, without having to otherwise modify the printer, or interfere with or interrupt normal printing, or the movement of the printed sheets in said paper path, and yet provide accurate color measurements of test color patches printed on the moving sheets as they pass the spectrophotometer. That enables a complete closed loop color control of a printer.

This invention utilizes a multiple illuminant sensor, such as a spectrophotometer as described above, to detect marking substrate area coverage. As used herein, "marking substrate area coverage" refers to the percentage of a given area of a marking substrate that is visibly altered by marking, expressed with respect to the total area. For example, when a yellow patch is created on a marking substrate by depositing dots of yellow toner or ink on the marking substrate, the dots may not completely cover the patch area; therefore, the marking substrate will be only partially covered by the dots. Thus, in this situation, the "marking substrate area coverage" refers to the ratio of the marking substrate within the area of the patch that is covered by the yellow dots to the total area of the patch.

If an on-line sensor is already used in the system for color calibration, this same sensor may also be used as the marking substrate area coverage sensor. Alternatively, a separate sensor may be used as the marking substrate area coverage sensor.

The marking substrate area coverage sensor obtains reflectance measurements from patches of a marking substrate. For example, the marked patches may be patches of a marking substance such as toner, ink or paint, or portions marked by etching or the like. Preferably, when a marked patch includes a patch of a marking substance, the patch is a single-color patch. Coverage information is then extracted from these reflectance measurements. When the marking is performed using a marking substance, the reflectance measurements may be detected after the marking substance has been deposited on a marking substrate, such as a sheet of paper or the like. Alternatively, the reflectance measurements may be obtained when the marking substance is in an intermediate state, such as when toner is adhered to a photoreceptor drum or belt prior to being transferred and fused to a marking substrate.

A Neugebauer model may be used to obtain the reflectance measurements. The Neugebauer model uses Neugebauer primaries, which include primary colors such as C, M, Y and K and also include combinations of the primary colors such as CM, CY, CK, MY, MK, etc. In the Neugebauer model, as known by those skilled in the art, the weights of Neugebauer primaries represent the fractional area coverage of the primaries. This invention, rather than using a mixed color model, utilizes the marking substrate area coverage sensor to estimate the fractional area coverage of the individual primaries using their respective reflectance measurements.

A batch least squares algorithm may be used to estimate the appropriate parameters of the Neugebauer model. For improved accuracy, a recursive least squares algorithm may be used. The recursive least squares algorithm allows the marking substrate area coverage sensor to calibrate itself to changes in the sensing environment.

These and other objects, advantages and salient features of the invention are described in or are apparent from the following description of exemplary embodiments.

BRIEF DESCRIPTION OF THE DRAWINGS

Exemplary embodiments of the invention will be described with reference to the drawings, wherein like numerals represent like parts, and wherein.

DETAILED DESCRIPTION OF PREFERRED EMBODIMENTS

This invention provides a marking substrate area coverage sensor with multiple illuminants, such as multiple LEDs. The marking substrate area coverage sensor may be the same sensor as a sensor that provides other information, such as color information, used for color calibration.

In the context of a system as described in above-mentioned U.S. Pat. No. 6,236,474, in which a device independent color controller is considered to be a "level 4" controller, a sensor according to this invention can provide information to level 2, 3 and 4 controllers when the level 3 and 4 controllers are implemented by sensing from the paper. Therefore, this invention has the beneficial effect of reducing the number of sensors required.

Figure 1:
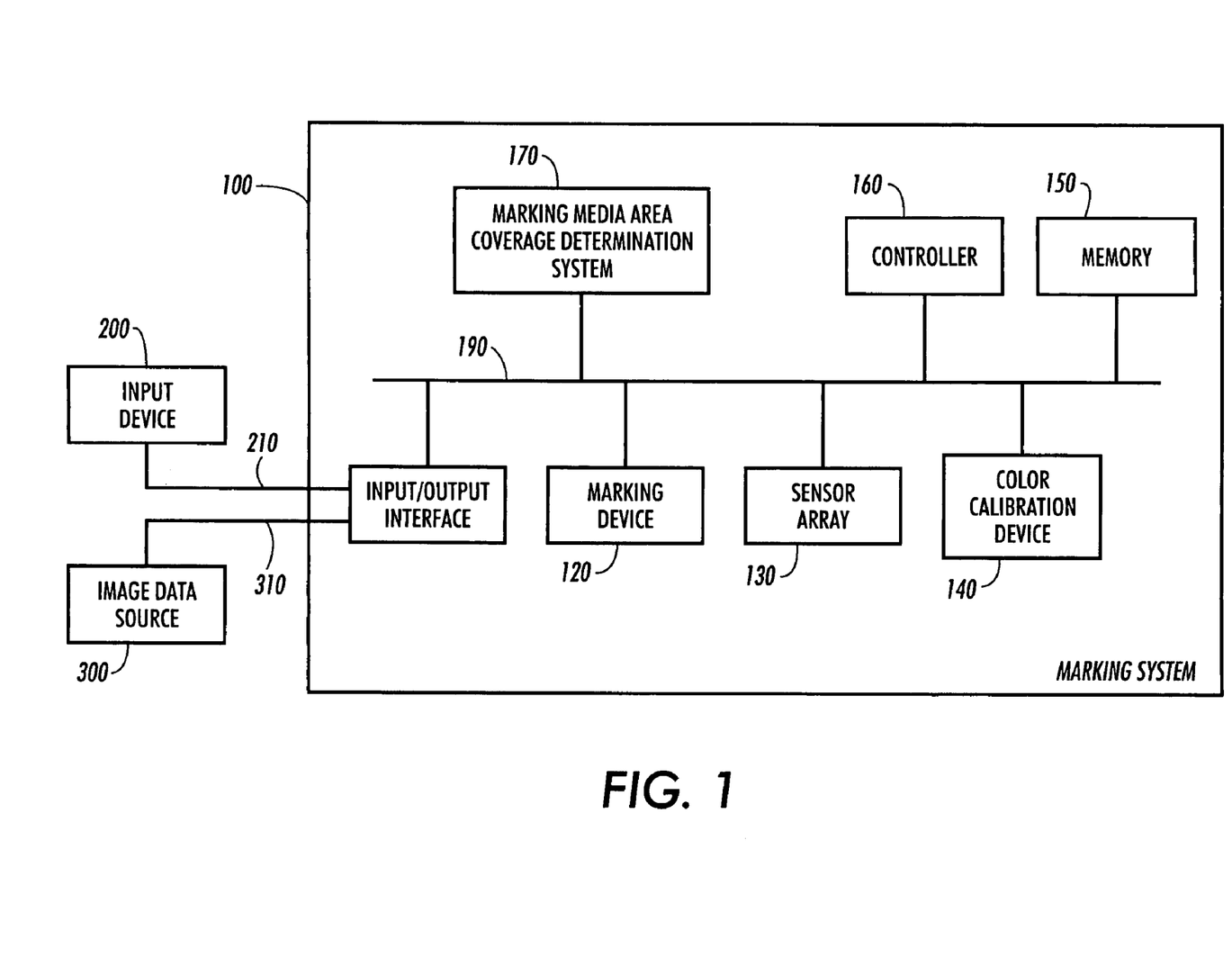
FIG. 1 is a functional block diagram illustrating an exemplary embodiment of a marking system according to the invention.

FIG. 1 is a functional block diagram illustrating an exemplary embodiment of a marking system 100 according to this invention. The marking system 100 is connected to an input device 200 via a link 210. The input device 200 inputs various information needed to implement the operations of the marking system 100, as described in more detail below, and may include a mouse, a keyboard, a touch-screen input device, a voice recognition-based input device, and/or any other known or later developed device usable for inputting information. The marking system 100 is connected to an image data source 300 via a link 310.

The image data source 300 can be a digital camera, a scanner, or a locally or remotely located computer, or any other known or later developed device that is capable of generating electronic image data. Similarly, the image data source 300 can be any suitable device that stores and/or transmits electronic image data, such as a client or a server of a network. The image data source 300 can be integrated with the marking system 100, as in a digital copier having an integrated scanner. Alternatively, the image data source 300 can be connected to the marking system 100 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 300 is thus any known or later developed device which is capable of supplying electronic image data over the link 310 to the marking system 100. The link 310 can thus be any known or later developed system or device for transmitting the electronic image data from the image data source 300 to the marking system 100.

Further, it should be appreciated that the links 210 and 310 can be a wired, wireless or optical link to a network (not shown). The network can be a local area network, a wide area network, an intranet, the Internet, or any other distributed processing and storage network.

The marking system 100 includes a marking device 120, a sensor array 130, a color revision device 140, a memory 150, a controller 160 and a marking substrate area coverage determination system 170, which are interconnected by a data/control bus 190.

The marking device 120 may be, for example, a print engine/printing head or marking engine/marking head that marks a substrate using any known or later developed marking process, including ink printing processes and xerographic printing processes.

The sensor array 130 includes multiple illuminants, such as LEDs, lasers or the like, arranged around a central photodetector (not shown), or arranged in correspondence to a plurality of photodetectors or photosites as described in above-mentioned co-pending U.S. application Ser. No. 09/862,247, U.S. application Ser. No. 09/863,042, and/or U.S. application Ser. No. 09/888,791. The illuminants will be referred to hereafter as LEDs for convenience. The number of LEDs is preferably any number greater than three, when a single photosensor is used, or may be as low as two when multiple photosites or photosensors are used. If three or fewer LEDs are used, they should be relatively broad band LEDs in order to give enough information for extracting area coverage of all primary colors. A larger number of LEDs gives greater accuracy, but it costs more to include more LEDs, and thus there are practical limits to the number of LEDs included in the sensor array 130. Therefore, the number of LEDs is preferably from about 8 to about 16.

The color revision device 140 calibrates the output of the marking device 120 in accordance with information obtained from the sensor array 130. This calibration may be performed as often as necessary or desired to maintain a desirable output of the marking device 120.

The memory 150 may serve as a buffer for information coming into or going out of the marking system 100, may store any necessary programs and/or data for implementing the functions of the marking system 100, and/or may store data at various stages of processing. Furthermore, it should be appreciated that the memory 150, while depicted as a single entity, may actually be distributed. Alterable portions of the memory 150 are, in various exemplary embodiments, implemented using static or dynamic RAM. However, the memory 150 can also be implemented using a floppy disk and disk drive, a writeable optical disk and disk drive, a hard drive, flash memory or the like. The generally static portions of the memory 150 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The controller 160 controls the operation of other components of the marking system 100, performs any necessary calculations and executes any necessary programs for implementing the processes of the marking system 100 and its individual components, and controls the flow of data between other components of the marking system 100 as needed. It should be appreciated that the controller may actually include a plurality of discrete circuits, as in the case of the level 1–4 controllers in above-mentioned U.S. Pat. No. 5,471,313 and U.S. Pat. No. 6,236,474.

The marking substrate area coverage determination system 170 determines the area coverage of the marking medium in a single-color patch, based on information obtained from the sensor array 130. Exemplary methods for performing this determination using a Neugebauer model are described in detail below. It should be appreciated that, while the same sensor array 130 is used for both color calibration and marking substrate area coverage determination in the embodiment shown in FIG. 1, it is also possible to provide separate sensors for these function. However, in terms of cost, it is advantageous to use one sensor array for both functions.

It should be understood that each of the circuits shown in FIG. 1 can be implemented as portions of a suitably programmed general purpose computer. Alternatively, each of the circuits shown in FIG. 1 can be implemented as physically distinct hardware circuits within an ASIC, or using a FPGA, a PDL, a PLA or a PAL, or using discrete logic elements or discrete circuit elements. The particular form each of the circuits shown in FIG. 1 will take is a design choice and will be obvious and predictable to those skilled in the art.

Exemplary algorithms that may be implemented by the controller 160 for determining spectra based on the output of the sensor array 130 are described below.

In the basic spectral Neugebauer model for halftone printing, the reflectance of any halftoned patch is given by the weighted average of the reflectance of its primaries, as described, for example, by M. Xia et al. in "End-To-End Color Printer Calibration by Total Least Squares Regression", *IEEE Transactions On Image Processing*, Vol. 8 No. 5, May 1999 and/or by R. Balasubramanian in "A Printer Model For Dot-On-Dot Halftone Screens", *Proc. SPIE: Color Hard Copy and Graphic Arts IV*, vol. 2413, pp. 356–364, 1995, which are both incorporated herein by reference in their entirety. Specifically, the reflectance is defined as $$r(\lambda) = \sum_{i=1}^{P} w_i r_i(\lambda) \tag{1}$$

where $\lambda$ represents the wavelength of the visible light, P is the number of Neugebauer primaries (For example, when a cyan primary is used, P=2. When four-color CMYK primaries are used, P=16 for a random mixing model, and P=5 for a dot-on-dot mixing model.), $r(\lambda)$ is the predicted spectral reflectance corresponding to a marked patch under analysis, $r_i(\lambda)$ is the reflectance spectra of the $i^{th}$ primary and $w_i$ represent the appropriate weighting factor for the $i^{th}$ primary.

If the paper penetration and scattering of light effects are considered, then the basic model shown in equation 1 includes an empirical correction factor n known as the Yule-Nielsen correction factor, and the reflectance of the marked patch under analysis is defined as $$r^{1/n}(\lambda) = \sum_{i=1}^{P} w_i r_i^{1/n}(\lambda) \tag{2}$$

An appropriate value for the Yule-Nielsen correction factor n can be obtained in accordance with a known method for Yule-Nielsen correction, such as that described in the above-mentioned publication by Xia et al.

Since the dot area coverage is to be measured for the reproduction of individual separation colors, e.g., cyan or magenta, the standard Demichel Equations described in the above-mentioned publication by Xia et al. can be used to represent $w_i$ in terms of the dot area coverage, c. The "dot area coverage" is also known as the "dot growth" or "dot area function."

$$w_1 = 1-c; w_2 = c \tag{3}$$

For the purpose of measuring dot area coverage for single separation colors such as cyan, magenta, yellow, etc., the number of primaries is limited to those reproduced by the single separation color and the base color of the marking substrate, i.e., the color of the original marking substrate before being marked. Thus, i=2. Assuming that the first Neugebuer primary corresponds to the base color of the marking substrate, the spectral model can be arranged to contain base color reflectance measurements, $r_1(\lambda)$. After substituting the base color reflectance and using fractional area coverage c in equation 2, the following linear equation is obtained:

$$r^{1/n}(\lambda) - r_1^{1/n}(\lambda) = c[r_2^{1/n}(\lambda) - r_1^{1/n}(\lambda)] \tag{4}$$

where $r_2(\lambda)$ is the reflectance spectra of the primary color with 100% area coverage and $r_1(\lambda)$ is the reflectance spectra of the base color of the marking substrate. For example, when the marking substrate is white paper, the base color is white. The fractional area coverage of the primary color will be measured by the sensor array 130.

Since color spectra are sampled at discrete wavelengths, $[\lambda_1, \lambda_2, \ldots, \lambda_N]$, equation 4 can be expressed in matrix form:

$$\underline{y} = \underline{A}c \tag{5}$$

where $$\underline{y} = \begin{bmatrix} r^{1/n}(\lambda_1) - r_1^{1/n}(\lambda_1) \\ r^{1/n}(\lambda_2) - r_1^{1/n}(\lambda_2) \\ \vdots \\ r^{1/n}(\lambda_N) - r_1^{1/n}(\lambda_N) \end{bmatrix} \text{ and } \underline{A} = \begin{bmatrix} r_2^{1/n}(\lambda_1) - r_1^{1/n}(\lambda_1) \\ r_2^{1/n}(\lambda_2) - r_1^{1/n}(\lambda_2) \\ \vdots \\ r_2^{1/n}(\lambda_N) - r_1^{1/n}(\lambda_N) \end{bmatrix} \tag{6}$$

where $\lambda_1, \lambda_2, \ldots \lambda_N$ represent the wavelengths at which reflectance values are measured. For example, at a 10 nm spectral resolution, $\lambda_1 = 360$ nm, $\lambda_2 = 370$ nm, ... $\lambda_N = 760$ nm. Thus, at 10 nm spectral resolution, N=36. Furthermore, the underscore ("_") is used in the above equations, and in other equations described below, to indicate a matrix or vector.

Equation 5 is a linear matrix equation that represents a model of an area coverage sensing system. The problem now becomes how to properly determine area coverage c in a real-world marking system. An exemplary method of estimating c is described below.

First, the reflectance of each primary color is measured using a respective marked patch, e.g., color patch, at substantially complete coverage, i.e., about 100% area coverage. This reflectance is stored in the sensor database. For paper or other substrate reflectance measurements, the reflectance of a blank sheet of paper or other substrate is stored in the memory 150 as the base color reflectance. If multiple types of paper or other substrate are to be used, e.g., in multiple supply trays of a photocopier or the like, the reflectance of a blank sheet of each different type of paper or other substrate is measured and stored in the memory 150. The corresponding measurements are re-arranged and stored in a matrix A, as shown in equation 6 above, for each type of substrate.

If the sensor array 130 is to measure the patch area coverage on the photoreceptor belt or drum, rather than on the paper or other substrate, a baseline reflectance measurement on the photoreceptor belt or drum is required. For the photoreceptor drum or belt measurements, the Yule-Nielsen correction factor, n, is set equal to 1.

Next, the sensor array 130 measures the reflectance of a marked patch under analysis, e.g., a target patch (preferably a single-color patch) of marking substance under analysis. The reflectance data is then re-arranged as shown in vector y above in Equation 6, using the reflectance values for marking substrate base color and $r_1(\lambda_1)$, $r_1(\lambda_2)$, ... $r_1(\lambda_N)$.

If conditions are ideal, then the area coverage can be obtained by simply solving a least squares problem for a one-time patch measurement. The least squares equation for estimating c best fits the primary spectra to the measured spectra by minimizing the square of the errors between them. That is, it minimizes the following error function, E(c):

$$E(c) = (y - Ac)^T (y - Ac) \quad (7)$$

where T indicates a matrix transpose.

Minimizing the error yields the following result:

$$\frac{\partial E}{\partial c} = 2(-\underline{A}^T \underline{y} + \underline{A}^T A c) = 0 \quad (8)$$

Therefore, $$\hat{c} = [A^T A]^{-1} A^T y \quad (9)$$

where $\hat{c}$ is the estimated value of the true area coverage c.

Equation 9 can be utilized for extracting area coverage values. However, it is prone to errors due to non-ideal initial conditions, variations from ideal initial conditions, noise in the sensor hardware, variations in temperature, variations in humidity, etc. Hence a recursive adaptive algorithm is preferably used for estimating c. The recursive adaptive algorithm requires making multiple measurements.

To implement a recursive algorithm, multiple measurements are taken of the same patch under measurement, or of different patches printed at the same area coverage. $\hat{c}$ is then recursively estimated using the adaptive equation shown below.

$$\hat{c}_{k+1} = \hat{c}_k + \alpha P_{k+1} A^T (y_{k+1} - A\hat{c}_k) \quad (10)$$

In this equation, the intermediate gain value $P_{k+1}$ is obtained using the following equation.

$$P_{k+1} = P_k - \frac{P_k \underline{A}^T A P_k}{1 + \underline{A}^T P_k \underline{A}} \quad (11)$$

where the initial estimate of scalar quantity $P_k$ can be obtained using $$P_k = A^T A \quad (12)$$

and the initial estimate $\hat{c}_k$ may be obtained from Equation (9). The factor $\alpha$ is a positive constant, which can be varied to adjust the convergence time (i.e., iteration steps). Appropriate values of the factor $\alpha$ are, for example, in a range from about 1.0 to about 50. Generally, the higher the value of $\alpha$, the faster the convergence.

The adaptive equation shown in equation 10 uses the previous estimate and the error between the outputs to converge to a new estimate. From equation 10 it is clear that the adaptive algorithm is of the form:

New estimate=old estimate+weight factor*error

If the old estimates are not accurate, then the recursive adaptive algorithm shown in equation 10 will add corrections to the old estimates to give new values, yielding more accurate estimates.

The number of iterations of the algorithm depends on factors including the desired level of accuracy and the value of the factor $\alpha$. Typically, with a factor $\alpha$ of about 1.5 or above, four, five or six iterations will suffice. A suitable number of iterations may be determined empirically from tests and then preset as the number of iterations to be performed. Alternatively, the process may, for example, determine a percentage change in $\hat{c}$ at the end of each iteration, and stop when a desired percentage is reached. For example, the process may automatically stop after the current iteration if $\hat{c}$ has not changed more than 1% compared to the previous iteration.

If the sensor array 130 is used for photoreceptor belt or drum area coverage measurements, its measurements are self-calibrating unless the 100% area coverage patch measurement varies with time (that is, when the reflectance spectra of the Neugebauer primary varies with time). If that happens, a one-time sensor calibration should be initiated by printing the Neugebauer primary color at 100% area coverage. This type of sensing does not require the need for a laborious calibration process as is done routinely on ETAC sensors.

Figure 2:
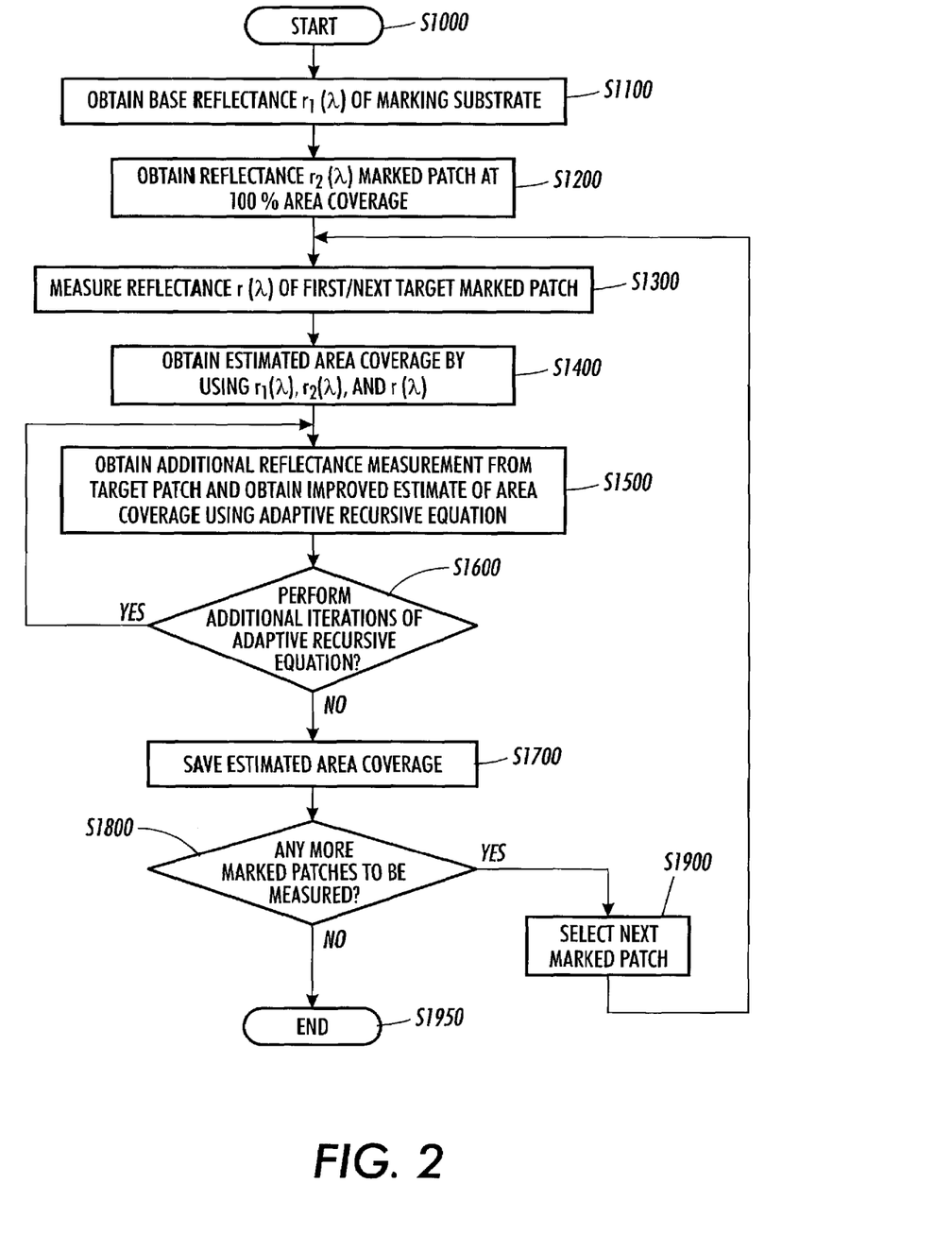
FIG. 2 is a flowchart illustrating an exemplary method of determining marking substrate area coverage according to the invention.

FIG. 2 is a flowchart illustrating an exemplary method of determining marking substrate area coverage according to this invention. Beginning in step S1000, the process continues to step S1100 and obtains a base reflectance of a marking substrate, i.e., the reflectance of an unmarked portion of the substrate. The process then continues to step S1200 and obtains a reference reflectance, e.g., the reflectance of a marked patch at 100% coverage. The process then continues to step S1300 and obtains a target reflectance, which is the reflectance of a target marked patch. The process then continues to step S1400.

In step S1400, the process obtains an estimated area coverage using the base reflectance, the reference reflectance and the target reflectance. The area coverage may be obtained by a least squares equation. The process then continues to step S1500, where an additional reflectance measurement is obtained from the target patch, and an improved estimate of the area coverage is obtained using an adaptive recursive equation. The process then continues to step S1600.

In step S1600, the process determines whether to perform additional iterations of the adaptive recursive equation. This determination may be made in various ways. As one example, a suitable number of iterations may be determined empirically from observation of various tests. For example, if it is known from observation that five iterations generally suffice to give the desired level of accuracy, the process may have five iterations set as a default. Thus, the determination of step S1600 would be based on whether the default number of iterations had been reached. As another example, the process may compare the new estimate with a previous estimate (e.g., the estimate obtained in step S1400 or in a previous iteration of step S1500), determine the percentage change, and be set to perform additional iterations only when the percentage change is greater than a predetermined amount. For example, when the percentage change from one iteration to the next is only 1% or less, the process may be set to not perform any more iterations.

Steps S1500–S1600 are repeated until it is determined in step S1600 to not perform any more iterations of the adaptive recursive equation. When it is determined to not perform any more iterations of the adaptive recursive equation, the process continues to step S1700 and saves the most recent estimate of the area coverage. The process then continues to step S1800 and determines whether there are any more marked patches to be measured. If there are any more marked patches to be measured, the process continues to step S1900, selects the next marked patch, and repeats steps S1300–S1800. Otherwise, the process jumps to step S1950 and ends.

In embodiments, one or more portions of the process shown in FIG. 2 may be omitted. For example, when a least squares equation is used to estimate the area coverage in step S1400, this estimate may be sufficiently accurate. Thus, steps S1500–S1600 may be unnecessary. As another example, when the adaptive recursive equation is used in steps S1500–S1600, the initial estimate of the area coverage, which is used in the first iteration of the adaptive recursive equation, may be obtained by methods other than the method of claim 1400. For example, an initial estimate of the area coverage may be input manually, based on the experience or "best guess" of the user, or set as a default. After the area coverage has been estimated and saved for one target patch, the same estimate may be used as the initial estimate when estimating the area coverage for the next target patch using the adaptive recursive equation. Thus, step S1400 may be unnecessary in some or all of the cycles of the process of FIG. 2.

Additionally, the sequence of steps of the process of FIG. 2 is not limited to that shown. Various changes to the order of steps may be made, as will be appreciated by those skilled in the art.

Figure 3:
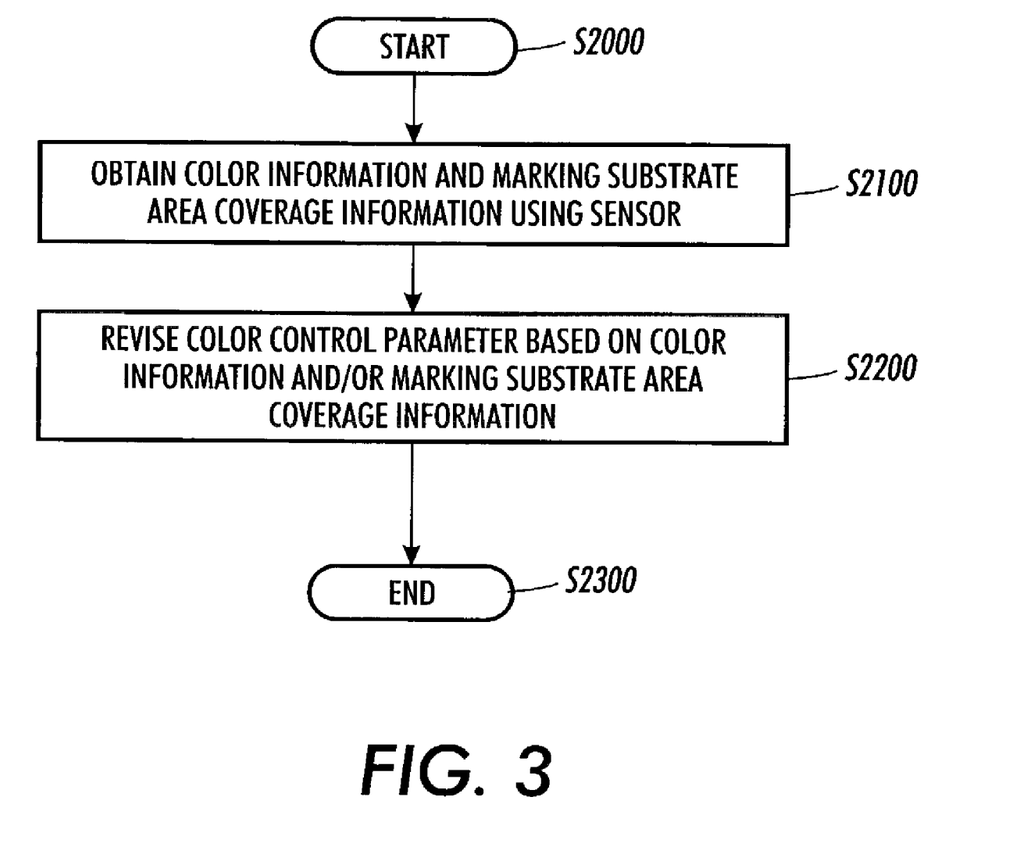
FIG. 3 is a flowchart illustrating an exemplary method of performing color control according to the invention.

FIG. 3 is a flowchart illustrating an exemplary method of performing color calibration and area coverage calibration according to the invention. Beginning in step S2000, the process continues to step S2100 and obtains both color information and marking substrate area coverage information using a sensor. Next, in step S2200, a color control parameter is revised based on the color information and/or the marking substrate area coverage information obtained in step S2100. The process then continues to step S2300 and ends.

The marking system 100 of FIG. 1 is preferably implemented either on a single program general purpose computer or separate programmed general purpose computer, with an associated sensor array 130 and marking device 120. However, the marking system 100 can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts shown in FIG. 2, or appropriate portions thereof, can be used to implement the marking device according to this invention.

Furthermore, the disclosed methods may be readily implemented in software using object or object-oriented software development environments that provide portable source code that can be used on a variety of computer or workstation hardware platforms. Alternatively, appropriate portions of the disclosed marking system 100 may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer or as a resource residing on a server or workstation, such as a routine embedded in a photocopier, a color photocopier, a printer driver, a scanner, or the like. The systems and methods can also be implemented by physical incorporation into a software and/or hardware system, such as the hardware and software system of a photocopier or a dedicated image processing system.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

For example, while the above-described exemplary embodiments have been discussed primarily in the context of ink-jet or xerographic printing, it should be understood that the invention may apply to any form of marking, e.g., to any process whereby one or more portions of a base object have their appearance altered by another material, such as in painting processes, coil coating or the like, or by a process, such as etching or the like.

Additionally, although the description above has included various references to color, such as cyan, magenta etc., it should be appreciated that, in embodiments, the invention may apply to single-color marking such as black printing, etching, single-color painting, etc.

What is claimed is:

1. A method of obtaining marking substrate area coverage information, comprising:

obtaining a base reflectance of an unmarked portion of a marking substrate;

obtaining a reference reflectance of a reference marked patch of the marking substrate at substantially complete coverage;

obtaining a target reflectance of a target marked patch of the marking substrate; and obtaining an estimated marking substrate area coverage $\hat{c}$ of the target marked patch by a least squares algorithm, based on the base reflectance, the reference reflectance and the target reflectance, using a Neugebauer model of the form $$y = Ac$$

where $$\underline{y} = \begin{bmatrix} r^{1/n}(\lambda_1) - r_1^{1/n}(\lambda_1) \\ r^{1/n}(\lambda_2) - r_1^{1/n}(\lambda_2) \\ \vdots \\ r^{1/n}(\lambda_N) - r_1^{1/n}(\lambda_N) \end{bmatrix} \text{ and } \underline{A} = \begin{bmatrix} r_2^{1/n}(\lambda_1) - r_1^{1/n}(\lambda_1) \\ r_2^{1/n}(\lambda_2) - r_1^{1/n}(\lambda_2) \\ \vdots \\ r_2^{1/n}(\lambda_N) - r_1^{1/n}(\lambda_N) \end{bmatrix},$$

and c is the actual marking substrate area coverage, where $\lambda_1, \lambda_2, \ldots \lambda_N$ represent the wavelengths at which reflectance values are measured, $r_1(\lambda)$ is the spectral reflectance of the base color of the marking substrate, $r_2(\lambda)$ is the spectral reflectance of a marked patch of substantially 100% area coverage, $r(\lambda)$ is a predicted spectral reflectance corresponding to a marked patch under analysis, n is a Yule-Nielsen correction factor, and N is a number of measured wavelengths of visible light, and wherein the least squares equation is defined by $$\hat{c} = [A^T A]^{-1} A^T y$$

where T indicates a matrix transpose.

2. The method of claim 1, wherein the marked patch comprises a marking substance.

3. The method of claim 2, wherein the marking substance is one of ink, toner and paint.

4. The method of claim 1, wherein the least squares algorithm minimizes the square of errors between the reference reflectance and the target reflectance.

5. A computer-readable storage medium on which is recorded a program for implementing the method of claim 1.

6. A marking system parameter control system, comprising a controller that:

obtains a base reflectance of an unmarked portion of a marking substrate using information output by the sensor;

obtains a reference reflectance of a reference marked patch of the marking substrate at substantially complete coverage;

obtains a target reflectance of a target marked patch of the marking substrate; and obtains an estimated marking substrate area coverage $\hat{c}$ of the target marked patch by a least squares algorithm, based on the base reflectance, the reference reflectance and the target reflectance, using a Neugebauer model of the form $$y = Ac$$

where $$\underline{y} = \begin{bmatrix} r^{1/n}(\lambda_1) - r_1^{1/n}(\lambda_1) \\ r^{1/n}(\lambda_2) - r_1^{1/n}(\lambda_2) \\ \vdots \\ r^{1/n}(\lambda_N) - r_1^{1/n}(\lambda_N) \end{bmatrix} \text{ and } \underline{A} = \begin{bmatrix} r_2^{1/n}(\lambda_1) - r_1^{1/n}(\lambda_1) \\ r_2^{1/n}(\lambda_2) - r_1^{1/n}(\lambda_2) \\ \vdots \\ r_2^{1/n}(\lambda_N) - r_1^{1/n}(\lambda_N) \end{bmatrix},$$

and c is the actual marking substrate area coverage, where $\lambda_1, \lambda_2, \ldots \lambda_N$ represent the wavelengths at which reflectance values are measured, $r_1(\lambda)$ is the spectral reflectance of the base color of the marking substrate, $r_2(\lambda)$ is the spectral reflectance of a marked patch of substantially 100% area coverage, $r(\lambda)$ is a predicted spectral reflectance corresponding to a marked patch under analysis, n is a Yule-Nielsen correction factor, and N is a number of measured wavelengths of visible light, and wherein the least squares equation is defined by $$\hat{c} = [A^T A]^{-1} A^T y$$

where T indicates a matrix transpose.

7. A method of obtaining marking substrate area coverage information, comprising:

obtaining a base reflectance of an unmarked portion of a marking substrate;

obtaining a reference reflectance of a reference marked patch of the marking substrate at substantially complete coverage;

obtaining an initial estimated marking substrate area coverage $\hat{c}$ of a target marked patch of the marking substrate;

obtaining a target reflectance of the target marked patch;

obtaining a first improved estimated marking substrate area coverage $\hat{c}$ by an adaptive equation, based on the initial estimated marking substrate area coverage $\hat{c}$, the base reflectance, the reference reflectance and the target reflectance using a Neugebauer model of the form $$y = Ac$$

where $$\underline{y} = \begin{bmatrix} r^{1/n}(\lambda_1) - r_1^{1/n}(\lambda_1) \\ r^{1/n}(\lambda_2) - r_1^{1/n}(\lambda_2) \\ \vdots \\ r^{1/n}(\lambda_N) - r_1^{1/n}(\lambda_N) \end{bmatrix} \text{ and } \underline{A} = \begin{bmatrix} r_2^{1/n}(\lambda_1) - r_1^{1/n}(\lambda_1) \\ r_2^{1/n}(\lambda_2) - r_1^{1/n}(\lambda_2) \\ \vdots \\ r_2^{1/n}(\lambda_N) - r_1^{1/n}(\lambda_N) \end{bmatrix},$$

and c is the actual marking substrate area coverage, where $\lambda_1, \lambda_2, \ldots \lambda_N$ represent the wavelengths at which reflectance values are measured, $r_1(\lambda)$ is the spectral reflectance of the base color of the marking substrate, $r_2(\lambda)$ is the spectral reflectance of a marked patch of substantially 100% area coverage, $r(\lambda)$ is a predicted spectral reflectance corresponding to a marked patch under analysis, n is a Yule-Nielsen correction factor, and N is a number of measured wavelengths of visible light, and wherein the adaptive equation is defined by $$\hat{c}_{k+1} = \hat{c}_k + \alpha P_{k+1} A^T (y_{k+1} - A\hat{c}_k)$$

where $P_{k+1}$ is an intermediate gain value obtained using $$P_{k+1} = P_k - \frac{P_k A^T A P_k}{1 + A^T P_k A}$$

where an initial estimate of scalar quantity $P_k$ is obtained using $$P_k = A^T A$$

and $\alpha$ is a positive constant and T indicates a matrix transpose.

8. The method of claim 7, further comprising:
repeating the obtaining a target reflectance of the target marked patch; and
repeating the obtaining a second improved estimated marking substrate area coverage $\hat{c}$, using the first improved estimated marking substrate area coverage $\hat{c}$ as the initial estimated marking substrate area coverage $\hat{c}$, the second improved estimated marking substrate area coverage $\hat{c}$ being closer than the first improved estimated marking substrate area coverage $\hat{c}$ to actual marking substrate area coverage c.

9. The method of claim 7, wherein the marked patch comprises a marking substance.

10. The method of claim 9, wherein the marking substance is one of ink, toner and paint.

11. The method of claim 7, wherein the obtaining the initial estimated marking substrate area coverage $\hat{c}$ comprises using a Neugebauer model of the form $$y = Ac$$

where $$\underline{y} = \begin{bmatrix} r^{1/n}(\lambda_1) - r_1^{1/n}(\lambda_1) \\ r^{1/n}(\lambda_2) - r_1^{1/n}(\lambda_2) \\ \vdots \\ r^{1/n}(\lambda_N) - r_1^{1/n}(\lambda_N) \end{bmatrix} \text{ and } \underline{A} = \begin{bmatrix} r_2^{1/n}(\lambda_1) - r_1^{1/n}(\lambda_1) \\ r_2^{1/n}(\lambda_2) - r_1^{1/n}(\lambda_2) \\ \vdots \\ r_2^{1/n}(\lambda_N) - r_1^{1/n}(\lambda_N) \end{bmatrix},$$

and c is the actual marking substrate area coverage, where $\lambda_1, \lambda_2, \ldots \lambda_N$ represent the wavelengths at which reflectance values are measured, $r_1(\lambda)$ is the spectral reflectance of the base color of the marking substrate, $r_2(\lambda)$ is the spectral reflectance of a marked patch of substantially 100% area coverage, $r(\lambda)$ is a predicted spectral reflectance corresponding to a marked patch under analysis, n is a Yule-Nielsen correction factor, and N is a number of measured wavelengths of visible light.

12. A computer-readable storage medium on which is recorded a program for implementing the method of claim 7.

13. A marking system parameter control system, comprising a controller that:
obtains a base reflectance of an unmarked portion of a marking substrate;
obtains a reference reflectance of a reference marked patch of the marking substrate at substantially complete coverage;
obtains an initial estimated marking substrate area coverage $\hat{c}$ of a target marked patch of the marking substrate;
obtains a target reflectance of a target marked patch;
obtains a first improved estimated marking substrate area coverage $\hat{c}$ by an adaptive equation, based on the initial estimated marking substrate area coverage $\hat{c}$, the base reflectance, the reference reflectance and the target reflectance using a Neugebauer model of the form $$y = Ac$$

where $$\underline{y} = \begin{bmatrix} r^{1/n}(\lambda_1) - r_1^{1/n}(\lambda_1) \\ r^{1/n}(\lambda_2) - r_1^{1/n}(\lambda_2) \\ \vdots \\ r^{1/n}(\lambda_N) - r_1^{1/n}(\lambda_N) \end{bmatrix} \text{ and } \underline{A} = \begin{bmatrix} r_2^{1/n}(\lambda_1) - r_1^{1/n}(\lambda_1) \\ r_2^{1/n}(\lambda_2) - r_1^{1/n}(\lambda_2) \\ \vdots \\ r_2^{1/n}(\lambda_N) - r_1^{1/n}(\lambda_N) \end{bmatrix},$$

and c is the actual marking substrate area coverage, where $\lambda_1, \lambda_2, \ldots \lambda_N$ represent the wavelengths at which reflectance values are measured, $r_1(\lambda)$ is the spectral reflectance of the base color of the marking substrate, $r_2(\lambda)$ is the spectral reflectance of a marked patch of substantially 100% area coverage, $r(\lambda)$ is a predicted spectral reflectance corresponding to a marked patch under analysis, n is a Yule-Nielsen correction factor, and N is a number of measured wavelengths of visible light, and wherein the adaptive equation is defined by $$\hat{c}_{k+1} = \hat{c}_k + \alpha P_{k+1} A^T (y_{k+1} - A\hat{c}_k)$$

where $P_{k+1}$ is an intermediate gain value obtained using $$P_{k+1} = P_k - \frac{P_k A^T A P_k}{1 + A^T P_k A}$$

where an initial estimate of scalar quantity $P_k$ is obtained using $$P_k = A^T A$$

and $\alpha$ is a positive constant and T indicates a matrix transpose.

* * * * *